Jan. 8, 1957 W. W. LOGAN 2,777,012

MULTISTATION REMOTELY-CONTROLLED PHONOGRAPHIC SYSTEM

Filed Dec. 19, 1951 4 Sheets-Sheet 1

INVENTOR
William W. Logan
By Henry Lanahan
ATTORNEY

MULTISTATION REMOTELY-CONTROLLED PHONOGRAPHIC SYSTEM

Filed Dec. 19, 1951 4 Sheets-Sheet 2

INVENTOR
William W. Logan
By Henry Lanahan
ATTORNEY

Jan. 8, 1957 W. W. LOGAN 2,777,012

MULTISTATION REMOTELY-CONTROLLED PHONOGRAPHIC SYSTEM

Filed Dec. 19, 1951 4 Sheets-Sheet 3

Inventor
William W. Logan

By Henry Lanahan

Attorney

MULTISTATION REMOTELY-CONTROLLED PHONOGRAPHIC SYSTEM

Filed Dec. 19, 1951 4 Sheets-Sheet 4

Inventor
William W. Logan
By Henry Lanahan
Attorney 2,777,012
Patented Jan. 8, 1957

2,777,012

MULTISTATION REMOTELY-CONTROLLED PHONOGRAPHIC SYSTEM

William W. Logan, Glen Ridge, N. J., assignor to Thomas A. Edison, Incorporated, West Orange, N. J., a corporation of New Jersey Application December 19, 1951, Serial No. 262,403

23 Claims. (Cl. 179—6)

This invention relates to multistation remotely-controlled phonographic systems and particularly to improved arrangements for such systems adapted to insure privacy, and/or freedom from interference from others, to each user of the system, the term "user" being herein employed to mean the first of several operators at the remote stations to activate the phonographic system for use, and the term "use" being herein employed to mean to record and/or to reproduce and to start and stop the machine at will.

The invention is especially applicable to dictation-recording systems of the type disclosed in the pending Somers et al. application Serial No. 247,244, filed September 19, 1951, and entitled "Remotely-Controlled Dictation-Recording System," but no unnecessary limitation of the invention to these systems is intended. The feature disclosed herein of disabling the busy-signaling device at a remote dictator's station as that station is connected to activate the phonographic machine is claimed in the pending Somers et al. application Serial No. 280,074, filed April 2, 1952. Application Serial No. 247,244 above mentioned is now Patent No. 2,757,238, dated July 31, 1956, and application Serial No. 280,074 above mentioned is now Patent No. 2,755,341, dated July 17, 1956.

The dictation-recording system just referred to comprises a plurality of remote operators' stations connected in parallel to a single recording machine, the connections leading from each remote station comprising a combined communication and control circuit and a signal and/or control circuit. In this system, warning is given at all idle remote stations via the signal circuits when the system is in use, but such warning does not preclude others at idle stations from "listening in" to the dictation being recorded or reproduced by the user of the system or from talking into their microphones to interfere with such recordation or reproduction, or from manipulating their controls to interfere with the intended control of the system by the user.

An object of my invention is to provide a novel and improved means for phonographic systems of the character described for assuring privacy, and/or non-interference from other remote stations, to each user of the system.

Another object of my invention is to provide such improved means which comprises an electrically-energizable control device for each remote station and means controlled thereby arranged to require only one of such devices to be activated at a time.

Another object is to provide a novel privacy-assuring means for phonographic systems of the character described which is adapted to permit selected operators' stations to be made private while others may be left not private.

Another object is to provide a privacy-assuring means for such phonographic systems which is arranged so that when a selected remote station is in use all other of the remote stations are disabled and special warning is given at all disabled stations to apprise each operator thereat as to the disabled condition of the respective station.

Another object is to provide a novel and improved privacy means of the character above described which requires only three lead-out wires from each remote station.

Another object is to provide a novel remotely-controlled multistation phonographic system wherein operators at selected stations can monitor—i. e., listen to—the subject matter being recorded and/or reproduced by the one who initiated activation of the system, but have no control over the system.

These and other objects and features of my invention will be apparent from the following description and the appended claims.

In the description of my invention reference is had to the accompanying drawings, of which:

Since the invention has special application in connection with dictation-recording systems of the type above-mentioned, it is herein particularly described in connection with this type of dictation-recording system, but only such portions of this dictating system are shown as need be considered for the purposes of the present invention.

Figure 1:
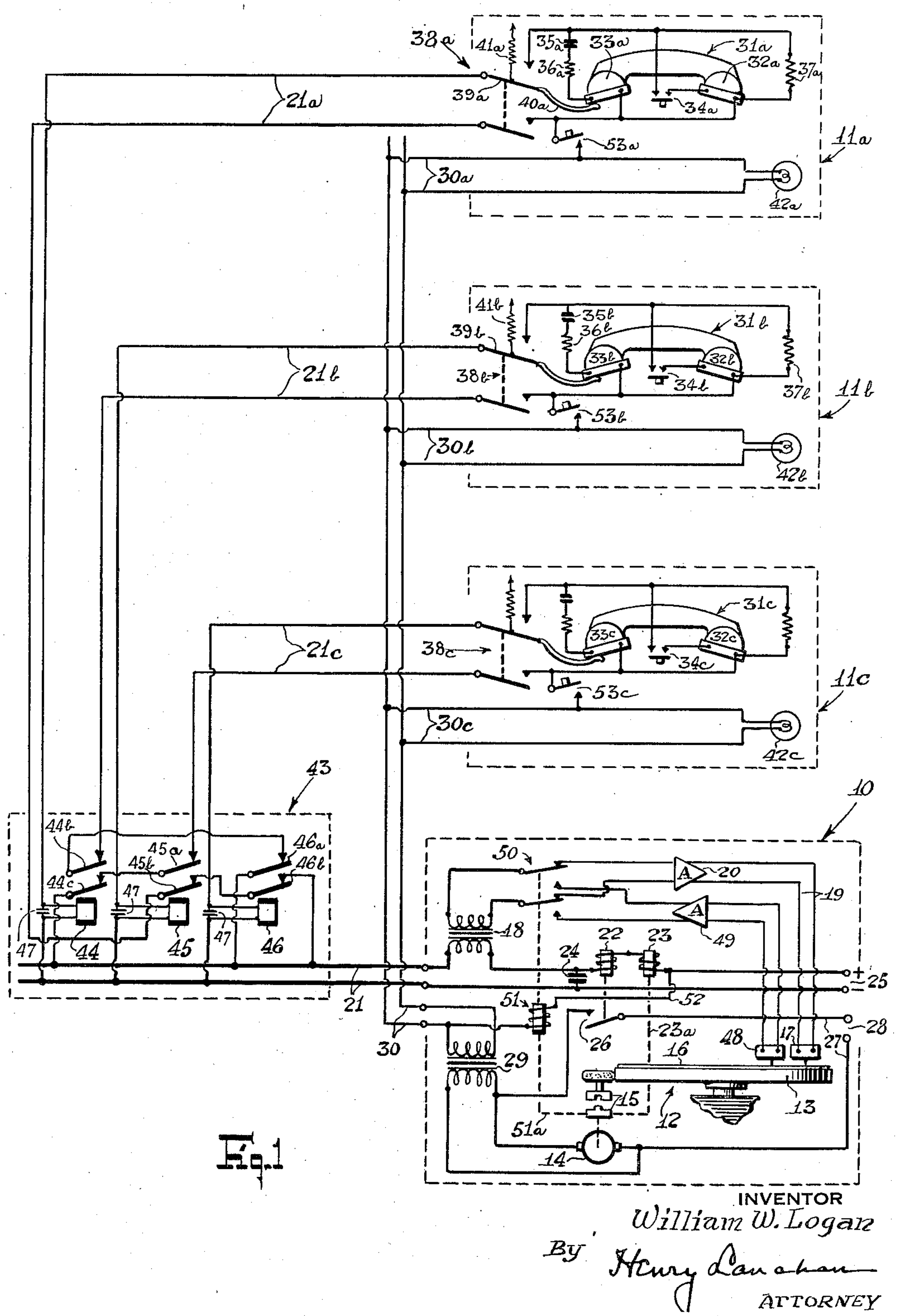
Figure 1 is a fractional diagrammatic showing of a multistation remotely-controlled phonographic system incorporating one embodiment of my invention for achieving privacy for each user of the system.

As shown in Figure 1, the dictating system comprises a home or attendant's station 10 and a plurality of identical remote operators' stations of which there are three shown by way of example, these stations being referred to as 11*a*, 11*b* and 11*c* respectively. At the attendant's station there is a dictating machine 12 (fractionally shown) which comprises a turntable 13 driven by a motor 14 through a clutch 15. The turntable carries a record disc 16 engaged by a recording unit 17. Audio speech-representing currents are fed to this recording unit through an audio transformer 18 and a circuit 19 including an amplifier 20.

The attendant's station is provided with a communication or audio circuit 21 which serially includes the primary of the audio transformer 18. This communication circuit is used also to control the machine, and for the latter purposes it includes two serially-connected relays 22 and 23. Audio currents in the communication circuit are by-passed around these relays by a condenser 24. The communication circuit is energized from a low-voltage D.-C. power source (not shown) which is connected to the terminals 25 marked "+" and "−" respectively. The relays are adapted to operate at different levels of direct current established selectively at the operators' stations as will appear. Relay 22 has contacts 26 operated at the lower current level to close the power circuit 27 serially including the motor 14. This power circuit is energized from an A.-C. source (not shown) which is to be connected to the terminals 28. The second relay 23 is adapted to operate at a higher level of current and controls the clutch 15 as represented diagrammatically by the tie-line 23*a*. These relays may of course perform still other control functions which need not however be herein described. For the present purposes it will be understood that the motor 14 is started when the relay 22 is operated and that the clutch 15 is engaged to start rotation of the turntable 13 when the relay 23 is operated. An energization of the communication circuit 21 at the lower current level, with resultant starting of the motor 14 or other conditioning of the machine for immediate start-stop operation, is herein considered as an activation of the dictating system.

In the power circuit 27 and in shunt with the motor 14 there is a voltage stepdown transformer 29 the secondary of which is connected to two outgoing leads constituting a signal circuit 30 for the dictating system. This signal circuit is accordingly energized whenever the dictating system is activated.

The operators' stations 11*a*, 11*b* and 11*c* are identical and a description of the station 11*a* will suffice for all three. Corresponding elements of these stations are given the same reference numerals but with the suffix letters of the respective stations.

The station 11*a* has a handpiece 31*a*, for example, of the usual telephone variety including, as transducer elements, a carbon button microphone 32*a* and a receiver 33*a*. The microphone 32*a* is connected in a branch 21*a* of the communication circuit 21 through a normally-open manual switch 34*a* positioned typically on the handpiece, and the receiver unit is connected in this branch in parallel with the microphone through a condenser 35*a* and resistor 36*a*. Also in this branch in parallel with the microphone is a resistor 37*a*. The station 11*a* is provided further with an on-off double-pole station switch 38*a* connected in series in the lines of the branch circuit 21*a* leading to the operator's station. The station switch contacts are closed and opened respectively as the station switch is moved to "on" and "off" positions. At least one of the movable pole elements of this station switch, herein referred to as 39*a*, is associated with the support for the handpiece 31*a*; for example, this pole element may have a hook-shaped end portion 40*a* adapted to receive the handpiece and support it in idle position when the station is not in use. The pole elements of the station switch are urged upwardly into closed positions by a spring 41*a*, but when the handpiece is placed on the support 40*a* the weight thereof is sufficient to overcome the spring and to hold the station switch open. In Figure 1 the handpiece is shown resting on its support to hold the station switch 38*a* open.

The signal circuit 30, like the communication circuit 21, has a branch to each remote station and designated by the reference numeral 30 with the suffix letter of the respective station. Serially included in the branch 30*a* for station 11*a* is a signal lamp 42*a* for producing a busy signal at that station whenever the dictating system is in activated condition. Similar signal lamps are at stations 11*b* and 11*c*.

The communication circuit 21 has other branches 21*b* and 21*c* leading to the operators' stations 11*b* and 11*c* respectively, the same as is the case with the signal circuits. Except for a disabling relay system 43 provided in accordance with my invention to assure privacy to each user, the operators' stations would be connected permanently in parallel with the attendant's station to permit a non-user to listen in to a user's dictation or reproduction and otherwise to interfere with the user's control of the dictating system. However, this is prevented by the present disabling system. A feature of each of the embodiments of my invention herein described is that one disabling relay is provided in each branch communication circuit, that each relay is effective when energized to disable all other of the remote stations, and that only one of these relays is operated at any one time to provide the desired privacy for the user.

The disabling system 43 shown in Figure 1 comprises relays 44, 45 and 46 serially connected respectively in the branch communication circuits 21*a*, 21*b* and 21*c*. Paralleling each relay is a condenser 47 the purpose of which is to by-pass the audio currents around the respective relays. Each disabling relay has a normally-closed switch serially connected in each of the other branch communication circuits; for instance, in the three-station system herein shown by way of example, the relay 44 has two switches 44*b* and 44*c* in branch circuits 21*b* and 21*c* respectively, the relay 45 has two switches 45*a* and 45*c* in branches 21*a* and 21*c* respectively, and the relay 46 has switches 46*a* and 46*b* in branches 21*a* and 21*b* respectively. Before any of the on-off station switches of the remote stations are closed, the communication circuit 21 will have direct connection through the disabling relay switches to the respective branch communication circuits.

When an operator at one of the remote stations, say the station 11*a*, is the first to pick up his handpiece, the respective station switch 38*a* is closed to cause energization of the communication circuit 21 through the respective branch circuit 21*a* and the respective resistor 37*a* from the D.-C. power source. The energizing current which is so established in the communication circuit operates the relay 22 to start the motor 14, wherefore to activate the dictating system, and to cause busy signals to go on at each operator's station. Furthermore, this energizing current in the branch 21*a* operates the respective disabling relay 44 to open the branch communication circuits 21*b* and 21*c* wherefore to disable the stations 11*b* and 11*c*.

The operator at station 11*a*, having secured the system for his sole use in the manner abovedescribed, may proceed to record or reproduce dictation in the standard way as is described in the aforementioned Somers et al. application. For example, when the user (operator at station 11*a*) presses his manual switch 34*a*, the carbon button microphone 32*a* is connected also across the communication circuit in shunt with the resistor 37*a* to increase the level of direct current and to cause the relay 23 to operate. Operation of this relay causes the clutch 15 to be engaged to start record rotation and to enable recordation of dictation spoken into the microphone.

In order that the user may also listen back to his dictation, a reproducer 48 is provided in engagement with the record at a trailing distance from the recorder unit 17 and is connected through an amplifier 49 to two contacts of a double-pole two-position selector switch 50 provided for selectively connecting the audio transformer 18 either to the recording amplifier 20 or to the reproducing amplifier 49. (Alternatively, one amplifier with suitable switching may be used for both recording and reproducing purposes, as is well known in the art.) The selector switch 50 is part of a relay 51. This relay also controls the clutch 15 by way of the tie-line 51*a* diagrammatically represented. An energizing circuit for this relay comprises a lead line 52 connected to the positive side of the potential source of the communication circuit, one side of the signal circuit 30 and branch circuit 30*a*, a manual switch 53*a* at the operator's station 11*a*, the station switch 38*a*, and the negative side of the communication circuit to the negative side of the D.-C. potential source. When the relay 51 is not energized, the selector switch is positioned to connect the audio transformer 18 to the recording amplifier 20 and the clutch 15 is then subject to the relay 23; and when the relay 51 is energized the selector switch 50 connects the audio transformer 18 to the reproducing amplifier 49 and the clutch 15 is engaged. Thus, upon closing the manual switch 53*a* while the handpiece is removed from its support, the relays 22 and 51 are both operated to cause the motor 14 to run, the reproducer 48 to be connected through the amplifier 49 and audio transformer 18 to the communication circuit 21, and the clutch 15 to be engaged, wherefore to enable recorded dictation to be reproduced through the receiver 33. During this reproducing operation, privacy is provided for the station operator, the same as during recording, since the disabling relay 44 remains still operated to keep all other branch communication circuits open.

Figure 2:
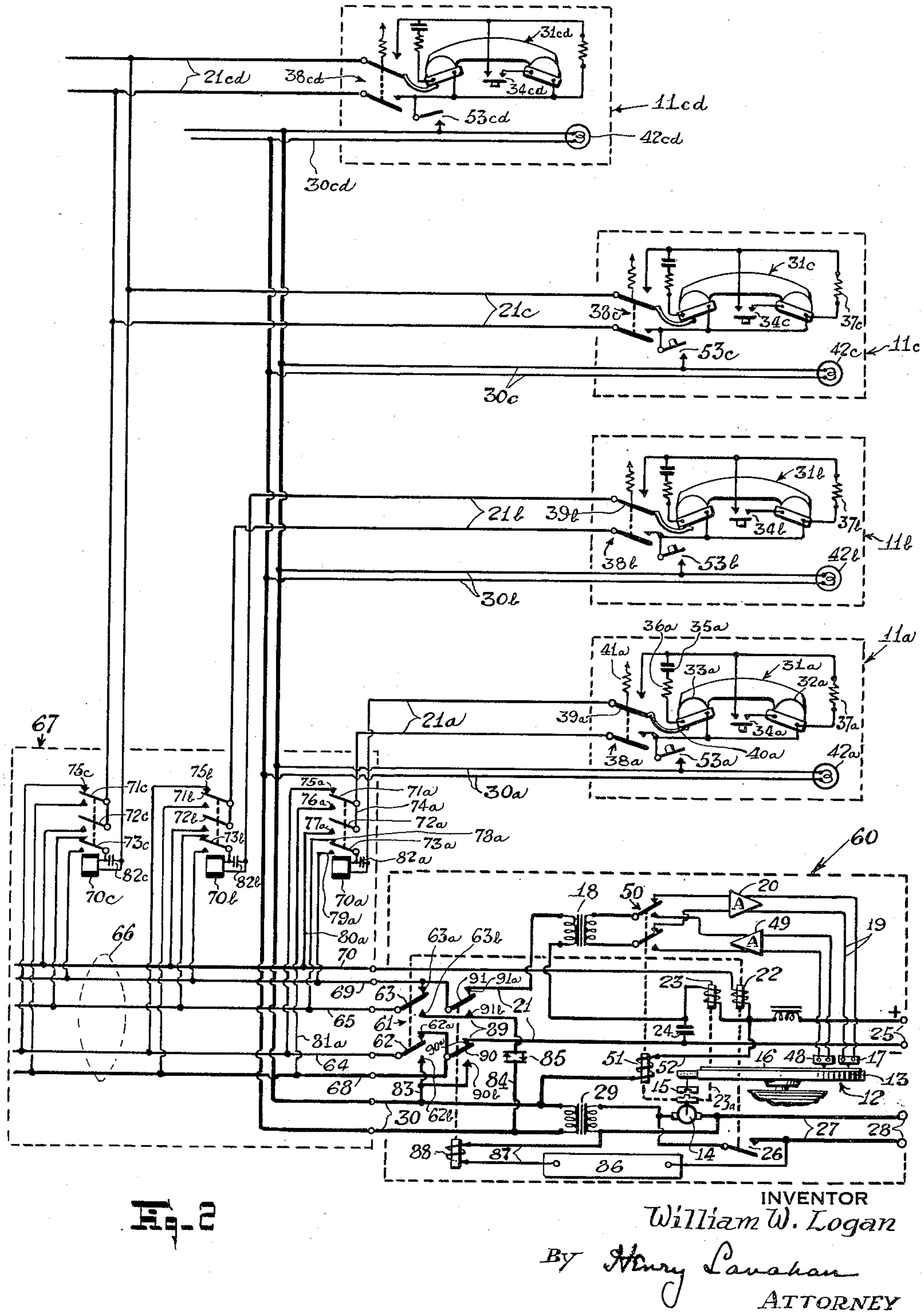
Figure 2 is a view, similar to Figure 1, showing a different embodiment of a system for the present purposes adapted to enable selected operators' stations to be made private while others are left not private.

In the embodiment shown in Figure 2, an attendant's station 60 is provided corresponding to station 10 of my first embodiment and having many of the same components given the same reference characters. Four remote operators' stations are shown, by way of example, two of which, referred to as 11a and 11b, are private and the other two of which, referred to as 11c and 11cd, are private with respect to stations 11a and 11b but not with respect to each other. Each of these remote operators' stations is the same as above described and the components thereof are given the same reference numerals as before with the suffix letters of the respective stations.

At the attendant's station there is a group 66 of main conductors leading to a disabling relay system 67 from which lead wires branch off to the respective remote operators' stations. Two of these main conductors, referred to as 64 and 65, are connectable to the main communication circuit 21 through a double-pole two-position switch 61 and through another such switch 89, the latter of which is in the position shown except during record change as is hereinafter described. The switch 61, which comprises pole 62 and contact 62a in the negative side of the communication circuit and pole 63 and contact 63a in the positive side of this circuit, is part of the activating relay 22. When this relay is not activated, the switch 61 is positioned, as shown, to connect the main conductors 64 and 65 to the communication circuit 21.

Two other main conductors 68 and 69 of the conductor group 66 are connected also to the communication circuit 21, at points between the switch 61 and the switch 89 abovementioned, and remain therefore connected to the communication circuit 21 irrespective of the condition of the activating relay 22. The relay 22 is preferably not connected serially in the communication circuit as in the previous embodiment, but is connected in a separate line 70 leading from the positive side of this communication circuit and constituting the fifth wire of the conductor group 66. It will be apparent from this description that the main conductor pair 64—65 is initially connected in parallel with the main conductor pair 68—69, and that both pairs are initially connected to the communication circuit 21 and energized by the potential source thereof, but that when the relay 22 is operated the energizing current is cut off from the main conductor pair 64—65.

Each of the branch communication circuits above mentioned leads off from the main conductor pair 64—65 and serially includes in the positive side thereof a disabling relay of the disabling relay system 67. Also, each disabling relay controls a three-pole switch, two poles of which are in the lines of the branch communication circuit in which the relay is connected. For example, the branch circuits 21a, 21b and 21c serially include disabling relays 70a, 70b and 70c respectively, there being no separate disabling relay for the branch circuit 21cd since this branch is in parallel with the branch 21c. Each disabling relay is shunted by a condenser referred to by the number 82 with the suffix letter of the respective relay, the purpose of which is to by-pass the audio currents in the communcation circuits around the relays. Each of these disabling relays controls three switch poles designated as 71, 72 and 73 with the suffix letter of the respective relay. Thus, relay 70a has switch poles 71a, 72a and 73a. Two of these switch poles, 71a and 72a, are electrically connected together by a jumper 74a and are connected to the negative side of the respective branch communication circuit 21a leading from the station 11a. The remaining pole 73a is connected to the positive side of the branch 21a but at the end of the coil of the respective relay 70a farthest from the respective station 11a. The pole 71a operates between contacts 75a and 76a, the pole 72a makes and breaks with respect to contact 77a and the pole 73a operates between contacts 78a and 79a. In the unoperated condition of the relay 70a, the pole 71a makes with contact 75a, pole 72a is open and pole 73a makes with contact 78a. The contacts 75a and 78a are connected respectively to the main conductors 64 and 65. Thus, when the disabling relays are in their unoperated positions, each branch communication circuit leading from the respective remote operator's station is connected through the respective disabling relay and associated contacts to the main conductors 64 and 65 which, as above described, are connected to the D.-C. potential source of the communication circuit until the dictating system is activated.

When an operator at a remote station lifts his handpiece from its support the respective station switch 38 is closed to complete the respective branch communication circuit through the resistor 37 of the respective station. Thus, when the operator at station 11a lifts his handpiece, the disabling relay 70a is operated. The effect of this operation is to shift poles 71a and 73a respectively to contacts 76a and 79a connected respectively to the main conductors 68 and 69; this simply reconnects the relay 70a and branch 21a to the same D.-C. potential source since the conductors 68 and 69 parallel the conductors 64 and 65 respectively. However, the contact make between pole 72a and contact 77a, which occurs also as the relay 70a is operated, completes the energizing circuit of the activating relay 22 via the main conductor 70 running from the positive side of the potential source for the communication circuit, lead wire 80a, contact 77a, pole 72a, jumper 74a, pole 71a, contact 76a, lead wire 81a main conductor 68 and the negative side of the communication circuit to the potential source. As the relay 22 is operated, it closes the switch 26 to activate the dictating system in the manner hereinbefore described and, additionally, it operates the switch 61 to disconnect the main conductors 64 and 65 from the communication circuit. Since all of the branch communication circuits are connected to the main conductors 64 and 65 through the respective disabling relays, the remaining remote operators' stations are disabled to prevent the operators thereat from listening to the user's dictation or reproduction or from interfering in any way with his control of the system.

The disabled condition of all stations not in use will remain so long as the user keeps his station switch closed to maintain the dictating system in activated condition. While the dictating machine is in such activated condition, the user may either record or reproduce dictation at will, all in privacy and without interference from others. Recordation is effected (1) by closing the start-stop switch 34a to step up the level of direct current in the branch communication circuit to cause clutch 15 to be closed by relay 23, and (2) then speaking into the microphone 32a to cause his speech to be recorded through the branch communication circuit 21a, condenser 82a, main conductors 68 and 69, shunt condenser 24, audio transformer 18, selector switch 50, recording amplifier 20 and line 19 to the recorder 17. Reproduction is effected by closing switch 53a while the start-stop switch 34a is released. As the switch 53a is so closed, an energizing circuit for the relay 51 is closed from the positive side of the branch communication circuit through the line 52 one side of the signal circuit 30, switch 53a, negative side of the branch communication circuit 21a, pole 71a, contact 76a, main conductor 68 and negative side of the communication circuit 21 to the negative side of the potential source of the communication circuit. As before, operation of the relay 51 closes the clutch 15 to start record rotation and shifts the selector switch 50 to connect the reproducer 48 through reproducing amplifier 49, switch 50, audio transformer 18, communication circuit 21, main conductors 68 and 69, poles 73a and 71*a* of relay 70*a*, station switch 38*a*, and condenser 35*a* and resistor 36*a* to the receiver 33*a*.

The double-pole switch 61 controlled by the activating relay 22 has a second pair of contacts 62*b* and 63*b* connected by lines 83 and 84 to the signal circuit 30. When the dictating system is activated the poles 62 and 63 make with their *b* contacts to connect the now idle main conductors 64 and 65 to the signal circuit. This causes a heavy 60-cycle hum to be fed to each disabled remote station. This signal will be reproduced at any such remote station when the non-user thereat picks up his handpiece, and will serve to apprise the non-user as to the disabled condition of his station. Only in order that the frequency of this warning signal may be raised and the character thereof modified to make the signal thereof more audible and pleasant to hear, a pair of rectifiers 85, connected reversely with respect to each other, are interposed in the line 84.

It is desired that all remote operators' stations be disabled while the attendant changes a record on the machine. As is described in the Somers et al. application Serial No. 247,244 hereinbefore mentioned, a number of disabling switches may be provided for this purpose each of which is necessarily operated incidental to changing a record on the machine. These switches are herein diagrammatically represented and referred to as 86, and are connected to an energizing circuit 87 of a relay 88 controlling the double-pole switch 89 aforementioned. This switch 89 comprises poles 90 and 91 connected permanently to the main conductors 68 and 69 and normally engaging contacts 90*a* and 91*a* in the negative and positive sides respectively of the communication circuit. When the relay 88 is operated, these poles break with their *a* contacts and make with contacts 90*b* and 91*b* respectively. These *b* contacts are connected to the contacts 62*b* and 63*b* respectively of the switch 61 above described. As the poles 90 and 91 break with their *a* contacts energizing current is cut off from both main conductor pairs 64—65 and 68—69 to disconnect all remote operators' stations from the communication circuit 21; as these same poles next make with their *b* contacts a warning signal from the transformer 29 is fed to each of these remote stations as above described.

The remote station 11*cd* is connected in parallel with station 11*c* and is afforded privacy with respect to the stations 11*a* and 11*b* but not with respect to station 11*c*. This feature of being able to connect a remote station so that it will be wholly private with respect to all other stations or private with respect to only some of those stations is an important one in the present invention and is made possible by the fact that only one disabling relay is activated at a time—the relay associated with the respective remote station in use—and that disabling relay serves to disable all remaining remote stations.

Figure 3:
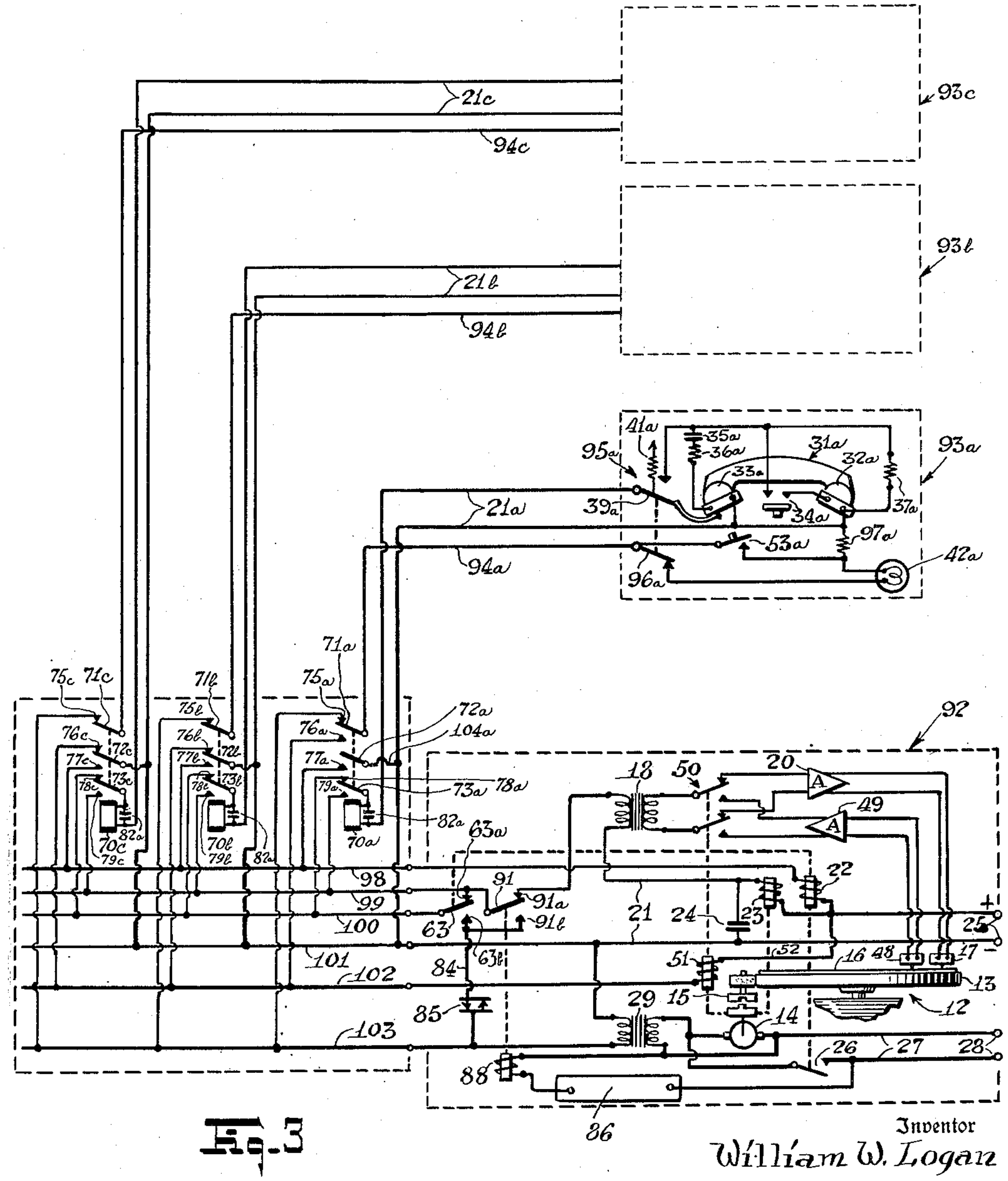
Figure 3 is a diagrammatic showing of a simplified form of the apparatus shown in Figure 2.

In my third embodiment shown in Figure 3 there is an attendant's station 92 and identical remote operators' stations 93*a*, 93*b* and 93*c* the main components of which are the same as before and are given the same reference characters. Again, the components of the remote operators' stations are given the same reference characters with the suffix letters of the respective stations. This embodiment has one disabling relay for each remote station, the same as before, the purpose of which is to afford privacy to the user of the system. Since these disabling relays are the same as in my second embodiment they are referred to by the same reference characters.

This third embodiment is featured by a simplification which reduces from four to three the number of lead wires to each remote station. Two of these three lead wires comprise a branch communication circuit again referred to by the numeral 21 with the suffix letter of the respective station. The third lead referred to by the number 94 with the suffix letter of the respective station, cooperates with the negative side of the associated branch communication circuit to constitute a signal circuit, as will appear.

An on-off station switch 95*a* is provided for each remote station and comprises a switch pole 39*a* in the positive side of the branch communication circuit which is biased closed, the same as before. The second pole element 96*a* of this station switch is biased open and is connected in the signal line 94*a* leading to the signal lamp 42*a*. The far side of this signal lamp is connected through a resistor 97*a* to the negative side of the branch communication circuit. In this embodiment the signal circuit is opened as the respective station switch is moved to "on" position to close the branch communication circuit. This means that no busy signal is given at each user's station but only at the disabled stations not in use, provided the handpiece at each of these disabled stations is on its support to cause the respective station switch to be in its "off" position.

Leading from the attendant's station are six main conductors 98–103 inclusive from which lead connections branch off, mainly through the respective disabling relays and associated switch contacts, to the respective remote operators' stations. The activating relay 22 is connected at one end to the positive side of the potential source of the communication circuit 21 and at the other end to the main conductor 98. The positive side of the communication circuit 21 is connected, through contact 91*a* and pole 91 of the aforementioned relay 88, to the main conductor 99 and to the contact 63*a* of the activating relay 22. The pole 63 of this activating relay makes with the contact 63*a* to connect the main conductor 100 in parallel with the main line 99 while the dictating system is inactivated. Thus, except during record change when the relay 88 is operated to break pole 91 with contact 91*a*, the main conductor 99 is connected to the positive side of the communication circuit 21; also, before the dictating system is activated, the main conductor 100 is connected to the positive side of the communication circuit, the same as in my second embodiment. However, the switching which was provided in the negative side of the communication circuit in my second embodiment is herein deleted and instead the negative side is connected directly and permanently to a single one of the main conductors, the conductor 101.

Each of the remote operators' stations is connected to the main conductors in the same way as in the second embodiment, and a description of these connections for the station 93*a* will suffice for all. The negative side of the branch communication circuit 21*a* is connected directly to the main conductor 101, as just mentioned, but the positive side thereof is connected through the respective disabling relay 70*a* and shunt condenser 82*a* to the associated pole 73*a*. In the unoperated state of this relay, the pole 73*a* makes with contact 78*a* connected to the main conductor 100. Thus, when the operator at station 93*a* removes his handpiece, the respective branch communication circuit is completed from the positive side of the main communication circuit 21 through switches 91—91*a* and 63—63*a* to main conductor 100, next through switch 78*a*—73*a*, relay 70*a*, positive side of branch 21*a*, pole 39*a* of the respective station switch, resistance 37*a* and back through the negative side of the branch communication circuit to the negative side of the main circuit 21. The direct energizing current which flows in the branch communication circuit operates the relay 70*a* and shifts the pole 73*a* to contact 79*a* to reconnect this branch circuit to the main circuit via the main conductor 99. As the relay 70*a* is operated, the pole 72*a* which is connected by lead 104*a* to the negative side of the branch communication circuit, makes with the contact 77*a* connected to the main conductor 98 to complete the energizing circuit of the activating relay 22. Operation of this relay closes the switch 26 to start the motor and supply energizing current to the signaling transformer 29; also, it opens the switch 63—63*a* to disconnect the main conductor 100 from the power supply of the communication circuit. Since all other remote stations of non-users are connected to this main conductor 100, these stations are disconnected from the communication circuit and are disabled.

The output signaling current of transformer 29 is fed across the main conductors 101 and 103. The main conductor 103 is connected to the contact 75 of each disabling relay. On describing the invention with respect to relay **70*a*, as before, it will be noted that the associated pole 71*a* is connected to the signal circuit 94*a* leading to the station 93*a*. However, the pole 71*a* makes with the contact 75*a* only when the disabling relay 70*a* is not energized. Since the respective disabilng relay of the station in use is always operated, the signaling circuit to that station is cut off. However, at the disabled stations, the respective relay switch 71—75 is closed to cause signaling current to be fed to the signaling circuit comprising the line 94 of the respective station and the negative side of the respective branch communication circuit. At such disabled station the signaling current is fed through the pole 96 of the respective station switch, provided the handpiece is on its support, and through the resistance 97 to the signal lamp. But, if the operator lifts his handpiece from its support this signaling current is broken by the pole 96** of the respective station and the signal lamp will go out.

In order to apprise each non-user positively as to the disabled condition of his station, signaling current is fed from the transformer 29 to the branch communication circuit of each disabled station. This circuit is completed from one side of the secondary of the transformer 29 to the negative side of each branch communication circuit, the receiver 33, resistance 36, condenser 35 and pole 39 of that station, the positive side of the branch communication circuit through the condenser 82 shunting the respective disabling relay, the switch 73—78 of that relay and the main conductor 100, and then through the switch pole **63—63*b*, line 84 and reversely-connected rectifiers 85 (provided for tone and frequency effect as before) to the other side of the secondary of the transformer 29**.

As in the previous embodiment, each user is assured privacy and non-interference from others both during recording and reproducing operations. Recordation is controlled by the start-stop switch **34*a*, the closing of which is to step up the level of the direct current in the branch communication circuit to operate the relay 23 and close the clutch for starting record rotation. Since the branch communication circuit is then closed through to the main circuit 21, dictation spoken into the microphone at the user's station is transmitted as before to the recorder 17. To reproduce, the operator presses the switch 53*a* while the handpiece is off its support. This causes the relay 51 to be operated via the line 52 leading from the positive side of the D.-C. potential source for the communication circuit, the main conductor 102, relay switch 76*a*—71*a* (it being understood that the relay 70*a* is now operated), the signaling line 94*a*, the switch 53*a*, resistor 97*a*, and the negative side of the communication circuit to the other side of the D.-C. potential source. As the relay 51 is operated it closes the clutch 15 to start record rotation and operates the switch 50 to connect the reproducer 48 through the amplifier 49 to the audio transformer 18** in the communication circuit, wherefore to cause the receiver at the remote user's station to be connected through to the reproducer.

The switches 86 diagrammatically shown control the relay 88 to cause the switch **91—91*a* to be open during record change. This cuts off the power supply to all branch communication circuits and disables all remote stations, the same as before. Also, again, as the pole 91 leaves contact 91*a* it makes with contact 91*b* connected to line 84** wherefore to connect all branch communication circuits across the signal circuit to provide a strong warning signal to be fed to all remote operators' stations for reproduction at each such station whenever the operator picks up his handpiece from its support.

Figure 4:
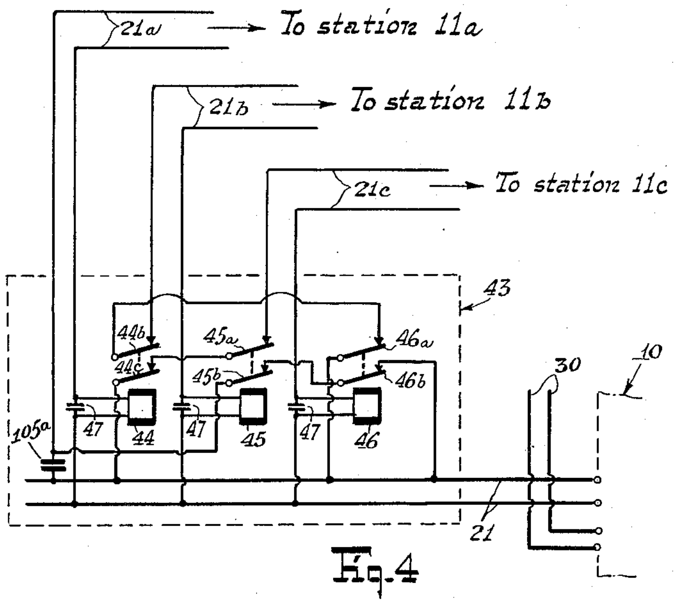
Figures 4 and 5 are modifications of portions of the system of Figures 1 and 2 respectively which are adapted to enable different operators to record and/or reproduce but which retain exclusive control over the system in the one initiating activation of the system.

In Figure 4 there is shown a portion of the system of Figure 1 which is modified only to the extent that the switches of the relays 44, 45 and 46 in a selected branch circuit are shunted by a condenser. For example, the relay switches in the branch circuit **21*a* are here shunted by a condenser 105*a*. This condenser enables transmission of audio currents between station 11*a* and the audio circuit of the machine notwithstanding that one or more of the switches in the respective branch circuit thereof are open. If, for example, the operator at station 11*c* should initiate activation of the system, he will have privacy as to station 11*b*, but the operator at station 11*a* can listen in, at will, to monitor the subject matter being recorded and reproduced. The operator at station 11*a* will not however have then any control over the machine since his branch circuit will be held open, as to direct current, by the relay 46 in the branch circuit of station 11*c***. Thus, although the operators at a selected station or stations may monitor the system, control of the system remains exclusively with the operator who initiated activation of the system.

Figure 5:
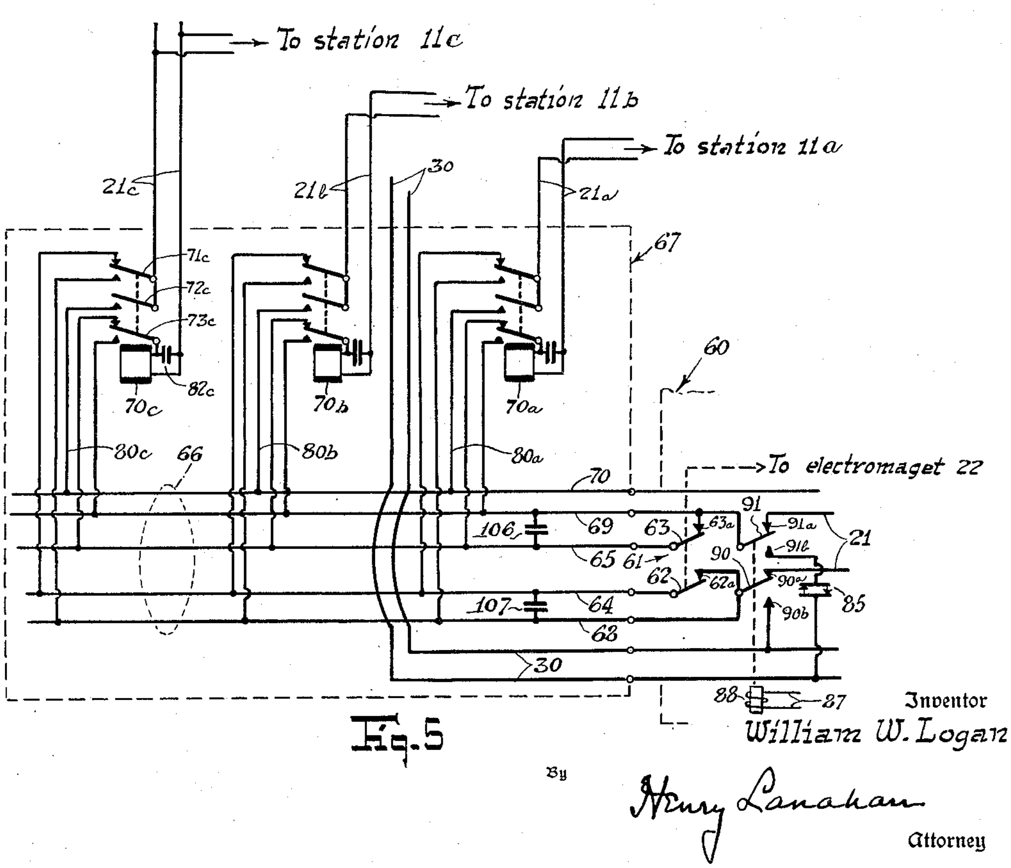

In Figure 5 a portion of the system of Figure 2 is shown to illustrate a modification thereof for the very same purposes as are described in the foregoing paragraph with respect to the modification of Figure 1. Here, the modifications are that a condenser 106 is connected between the main lines 65 and 69, a condenser 107 is connected between the main lines 64 and 68, and the contacts **62*b* and 63*b* of Figure 2 are eliminated to prevent signal currents from being fed to the idle stations via the switches 61. The effect of the condensers 106 and 107 is that, after an operator at one remote station initiates activation of the system, all operators at the remaining remote stations can monitor the subject matter being recorded or reproduced but these operators at the remaining stations have no control over the system; and the effect of eliminating the contacts 62*b* and 63*b* is to prevent signal current from being then fed to the monitoring stations. For example, if the one activating the system is at station 11*a*, relay 70*a* will be actuated and poles 62 and 63 will be broken with the contacts 62*a* and 63*a*. The station 11*a* then has a direct-current connection with the machine via the main lines 68 and 69 for controlling the machine. The remaining stations have only connections for audio transmission with the machine via the condensers 106 and 107 between the main lines 65—69 and 64—68** respectively. Thus the operators at these other stations can listen in at will, but exclusive control of the machine remains with the station operator who activated the system.

The embodiments of my invention hereinabove described are intended to be illustrative and not necessarily limitative of my invention since the same are subject to changes and modifications without departure from the scope of my invention, which I endeavor to express according to the following claims.

I claim:

1. In a remotely-controlled phonographic system including a source of D.-C. potential: the combination of an attendant's station including a phonographic machine; a plurality of remote operators' stations each including a transducer and an on-off station switch; circuit means including branch circuits leading from said remote stations respectively and controlled by said station switches respectively for connecting said transducers to said machine via the respective branch circuits to enable the use of said machine from any one of said remote stations upon the respective station switch being closed, said circuit means including said source of potential to cause energization of the branch circuit leading from the remote station in use; and an electrically-energizable means for each of said remote stations connected to the respective branch circuit for energization by said potential source when the respective station switch is closed to connect the respective transducer to said machine and including means operable by said electrically-energizable means as said transducer is connected to said machine for disabling all other of said remote stations.

2. In a remotely-controlled phonographic system including a source of D.-C. potential: the combination of an attendant's station including a phonographic machine; a plurality of remote operators' stations each including a transducer and an on-off station switch; circuit means including respective branch circuits leading from said remote stations respectively for connecting said remote stations to said machine to enable the use of said machine from any one of said remote stations upon the respective on-off switch being in "on" position, said circuit means including said source of potential to cause energization of the branch circuit leading from the remote station in use; and respective relays for said branch circuits each having a coil connected to the respective branch circuit for energization thereby when the respective on-off station switch is in "on" position, and the relay for each branch circuit having switch contacts connected to the other branch circuits and effective when the relay is energized for disabling all remote stations connected to the other of said branch circuits.

3. The combination set forth in claim 2 wherein said last-stated means comprises means for apprising the operator at each disabled station as to the disabled condition of that station.

4. The combination set forth in claim 2 including a source of signaling current, wherein said last-stated means includes means for connecting said source of signaling current to all of said other remote stations via the respective branch circuits.

5. The combination set forth in claim 2 including means controlled by said disabling means for feeding a warning signal to said disabled stations.

6. In a remotely-controlled phonographic system including a source of potential: the combination of an attendant's station including a phonographic machine; a plurality of remote operators' stations each including a transducer and an on-off station switch; circuit means including branch communication circuits leading from said remote stations respectively and controlled by said station switches respectively for connecting said transducers to said machine via the respective branch circuits, said circuit means including said source of potential to cause energization of one of said branch communication circuits when the respective station switch is in "on" position; respective relays for said remote stations having coils connected in the respective branch communication circuits of said remote stations each adapted for operation by said potential source when the respective station switch is in "on" position; and means comprising solely switches of said relays respectively and operated when one of said branch circuits is energized for disconnecting said source of potential from all other of said branch circuits.

7. The combination set forth in claim 6 including means controlled by said last-stated means for feeding a warning signal to each of said other branch circuits when said one branch circuit is energized.

8. In a remotely-controlled phonographic system including a source of potential: the combination of an attendant's station provided with a phonographic machine; a plurality of remote operators' stations each including a transducer and an on-off station switch; circuit means including respective branch circuits leading from said remote stations for connecting the latter to said machine to enable use of said machine from any one of said remote stations when the respective on-off station switch is in "on" position, said circuit means including said source of potential to cause energization of the branch circuit leading to the remote station in use; relay coils in said branch circuits respectively, each energized upon the respective on-off switch being moved to "on" position; and switch contacts associated with each of said relay coils and operable thereby, the switch contacts with each relay coil being connected in each of the other of said branch circuits for disabling said other branch circuits when the relay coil is energized.

9. In a remotely-controlled phonographic system including a source of potential: the combination of an attendant's station including a phonographic machine; a plurality of remote operators' stations each including a transducer and an on-off station switch; circuit means including branch communication circuits leading from said remote stations respectively and controlled by said station switches respectively for connecting said transducers to said machine via the respective branch circuits, said circuit means including said source of potential to cause energization of the respective branch circuit when one of said switches is moved to "on" position; respective relays for said remote stations each having a coil connected to the respective branch communication circuit for operation by said potential source when the respective station switch is in "on" position, each of said relays including a switch for every other branch circuit of said system; and means serially connecting the switches of each one of said relays in said other branch circuits respectively for causing said other branch circuits to be disabled when said one relay is operated.

10. In a remotely-controlled phonographic system including a source of potential: the combination of an attendant's station including a photographic machine; a plurality of remote operators' stations each including a transducer and an on-off station switch; circuit means including branch communication circuits leading from said remote stations respectively for connecting said transducers respectively to said machine and for activating said machine when the respective one of said station switches is closed, said circuit means comprising at least two pairs of main conductors at said attendant's station and means connecting both of said pairs to said potential source; means normally connecting said branch circuits in parallel across one of said pairs; a relay in each of said branch circuits operable by closure of the respective station switch, each of said relays including switch means normally positioned to connect the respective branch circuit to said one pair and effective on operation of the relay to disconnect the respective branch circuit from said one pair and connect it to said other pair; and a relay normally connected in common with both of said pairs of conductors operable upon closure of any one of said station switches for disconnecting said one pair from said potential source.

11. In a remotely-controlled phonographic system including a source of potential: the combination of an attendant's station including a phonographic machine; a plurality of remote operators' stations each including a transducer and an on-off station switch; circuit means including branch communication circuits leading from said remote stations respectively for connecting said transducers respectively to said machine and for activating said machine when the respective one of said station switches is closed, said circuit means comprising at least two pairs of main conductors at said attendant's station and means connecting both of said pairs to said potential source; means connecting said branch circuits in parallel across one of said pairs; an activating relay for said phonographic system and means controlled thereby as said phonographic system is activated for disconnecting said one pair from said potential source; and a relay connected to each of said branch circuits including switch means for shifting the connection of the respective branch circuit from said one pair to said second pair and for closing the energizing circuit of said activatng relay.

12. In a remotely-controlled phonographc system including a source of potential: the combination of an attendant's station including a phonographic machine; a plurality of remote operators' stations each including a transducer and an on-off station switch; circuit means including branch communication circuits leading from said remote stations respectively and controlled by said station switches respectively for connecting said transducers to said machine via the respective branch circuits; an activating relay for said machine; a signal source at said machine; means connecting said potential source to each of said branch communication circuits; electrically energizable control means in each of said branch communication circuits respectively operated as the respective on-off station switch is closed; and means rendered effective by said control means when one of said branch communication circuits is energized for disconnecting all other branch circuits from said potential source and for connectng the same to said signal source.

13. In a remotely-controlled multistation phonographic system: the combination of an attendant's station including a phonographic machine; a plurality of remote operators' stations each including a transducer, an on-off station control and a signal device; an audio circuit for said machine; branch communication circuits leading from said remote stations respectively to said audio circuit; a source of signal current at said attendant's station; and a branch signal circuit leading from each of said stations to said signal source and having one line in common with the respective branch communication circuit, each of said station controls comprising a switch in series with the respective branch communication circuit and a switch in series with the respective branch signal circuit held respectively closed and open when said station control is in "on" position.

14. The combination set forth in claim 13 including electrically-energizable control means in said machine selectively controllable to condition the machine for recording and reproducing and normally held in recording position; and an energizing circuit leading from each remote station for said control means comprising a respective branch signal circuit and a manual switch connected in parallel with the respective signal device at the respective remote station.

15. In a remotely-controlled multistation phonographic system: the combination of an attendant's station including a phonographic machine normally in record condition, a signal source and an electrically-energizable device to condition said machine for reproducing, and a source of D.-C. potential; a plurality of remote operators' stations each including a transducer, an on-off station switch, a signal device and a manual reproduce control switch for said machine; three wires leading from each of said remote stations one pair of which constitutes a branch communication circuit for connecting the respective transducer to the audio circuit of said machine when the respective station switch is closed and another pair of which constitutes both a signal circuit for connecting said signal device to said signal source and a control circuit for controlling said conditioning device; means connecting said D.-C. potential source to each of said branch communication circuits and effective when one of said station switches is closed to cause energization of the respective branch circuit; and a relay in each of said branch communication circuits operated when the branch communication circuit is energized and having switch means in the respective branch signal-control circuit for connecting said signal device to said signal source when the branch communication circuit is not energized and for connecting said control switch to said conditioning device when the branch communication circuit is energized.

16. In a remotely-controlled multistation phonographic system including a source of D.-C. potential: the combination of an attendant's station including a phonographic machine; a plurality of remote operators' stations each including a transducer and an on-off station switch; circuit means including respective branch circuits serially including said station switches respectively and leading from said remote stations respectively to said machine; means for effecting closure of said branch circuits at said remote stations respectively as the respective station switches are moved to "on" position; means normally connecting each of said branch circuits to said potential source; and means responsive to closure of one of said branch circuits at one of said remote stations by movement of the respective station switch to "on" position for disconnecting all other of said branch circuits from said source.

17. In a remotely-controlled multistation phonographic system including a source of D.-C. potential: the combination of an attendant's station including a phonographic machine; a plurality of remote operators' stations each including a transducer and an on-off station switch; circuit means including respective branch circuits serially including said station switches respectively and leading from said remote stations respectively to said machine; means for effecting closure of said branch circuits at said remote stations respectively as the respective station switches are moved to "on" positions; means including first and second circuit lines for connecting said potential source to said branch circuits via different circuit paths including means normally positioned to complete one of said circuit paths through said first circuit line; and means responsive to closure of one of said branch circuits by movement of the respective station switch to "on" position for transferring the connection of said potential source with said one branch circuit from said one path to a path through said second circuit line and for disconnecting said first circuit line from said source whereby to remove operating potential from the remaining branch circuits.

18. The combination set forth in claim 17 including a warning signal source; and means controlled by said last-stated means for connecting said first circuit line to said warning signal source following the disconnection of said first circuit line from said potential source.

19. In a remotely-controlled multistation phonographic system including a source of potential: the combination of an attendant's station including a phonographic machine; a plurality of remote operators' stations each including a transducer and an on-off station switch; means for connecting said remote stations respectively to said machine; a relay associated with each of said remote stations and connected for energization by said potential source via the respective station switch as the same is closed; and switch means responsive to operation of each of said relays for rendering said connecting means ineffective as to each of the other of said remote stations.

20. In a remotely-controlled multistation phonographic system including sources of D.-C. and A.-C. potential: the combination of an attendant's station including a phonographic machine having audio circuits, and a drive motor operable by said A.-C. potential source; a plurality of remote operators' stations each including a transducer and an on-off station switch; means for connecting said remote stations respectively to said audio circuits of said machine, said connecting means including branch circuits leading respectively from said remote stations and each connected normally to said D.-C. potential source for energization thereby when the respective station switch is moved to "on" position; means for connecting said drive motor to said A.-C. potential source when any one of said branch circuits is energized; an audio signal current line at said attendant's station connected to said A.-C. potential source and serially including means for generating harmonics in the sensitive audio spectrum; an electrically-energizable station-disabling means for each of said remote stations operated by the branch circuit energizing current when the respective station switch is moved to "on" position; and means included in each of said station-disabling means and effective when the latter is operated for shifting the connection of all other of said branch circuits from said D.-C. potential source and audio circuits to said audio signal current line whereby to cause said signal current to be fed to said transducers respectively upon the associated station switches being moved to "on" position.

21. In a remotely-controlled phonographic system including a source of D.-C. potential: the combination of an attendant's station including a phonographic machine and a control device therefor operable by direct current; a plurality of remote operators' stations each including a transducer and a station switch; circuit means including a branch circuit leading from each remote station and controlled by the respective station switch for connecting the respective transducer to the audio circuit of said machine to enable use of the machine from said remote station when said station switch is closed, said circuit means including means for providing a direct-current connection between said D.-C. source and said control device when the station switch is closed; an electrically-energizable relay coil connected in each of said branch circuits for energization by said potential source when the respective station switch is closed; means controlled by said relay coils and effective when one of said relays is operated in response to closure of the station switch of the respective one of said remote stations for breaking the direct current connections between said machine and all other of said remote stations; and circuit means including a condenser for providing audio communication between the transducer of another of said stations and said audio circuit of said machine while said one relay is operated.

22. In a remotely-controlled phonographic system including a source of D.-C. potential: the combination of an attendant's station including a phonographic machine; a plurality of remote operators' stations each including a transducer and a station switch; circuit means including branch communication circuits leading from said remote stations respectively and controlled by said station switches respectively for connecting said transducers to said machine, said circuit means including said source of potential to cause energization of the respective branch circuit when one of said station switches is closed; respective relays for said remote stations each having a coil connected in the respective branch communication circuit for operation by said potential source when the respective station switch is closed, each of said relays including a switch for every other branch circuit of said system; means serially connecting the switches of each of said relays in said other branch circuits respectively for rendering said other branch circuits unable to carry direct current when a relay is operated; and a condenser shunting the relay switches of at least a selected one of said branch circuits for maintaining audio communication between said machine and the remote station connected to said selected branch circuit while a relay of any other of said branch circuits is operated.

23. The combination set forth in claim 10 including condenser means connected to said branch circuits for maintaining audio circuit connections between said remaining branch circuits and said audio system of said machine while said common connecting means is operated.

References Cited in the file of this patent

UNITED STATES PATENTS

| | | |
|---|---|---|
| 1,227,735 | Barrows | May 29, 1917 |
| 1,512,719 | Stiles | Oct. 21, 1924 |
| 1,993,870 | Belliveau | Mar. 12, 1935 |
| 2,066,672 | De Bevard | Jan. 5, 1937 |
| 2,200,351 | Whitehead et al. | May 14, 1940 |
| 2,284,306 | Sparling | May 26, 1942 |
| 2,333,235 | Clausen | Nov. 2, 1943 |
| 2,485,381 | Hornor | Oct. 18, 1949 |
| 2,497,037 | Someus et al. | Feb. 7, 1950 |
| 2,547,216 | Knobler | Apr. 3, 1951 |